Patented Nov. 11, 1930

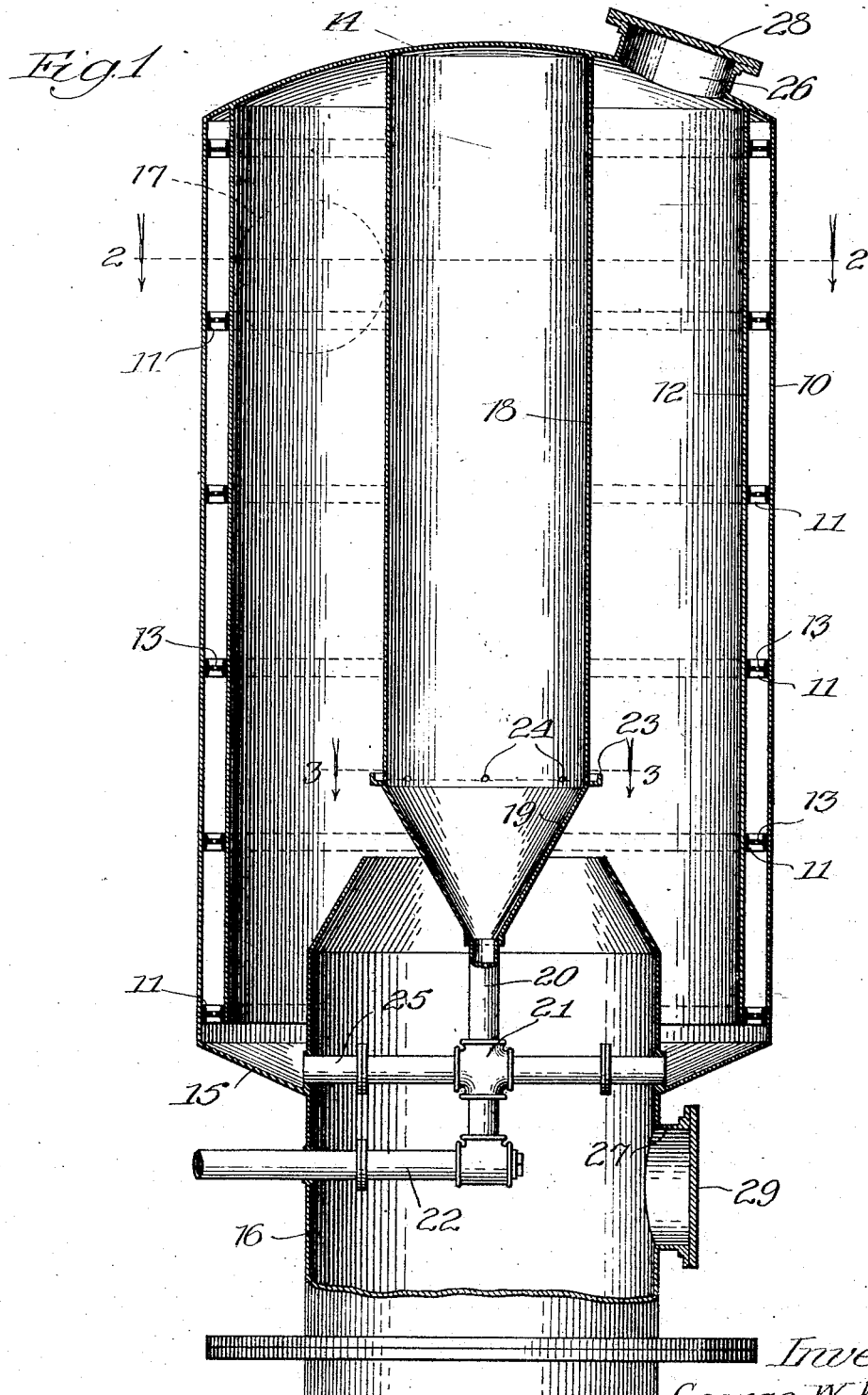

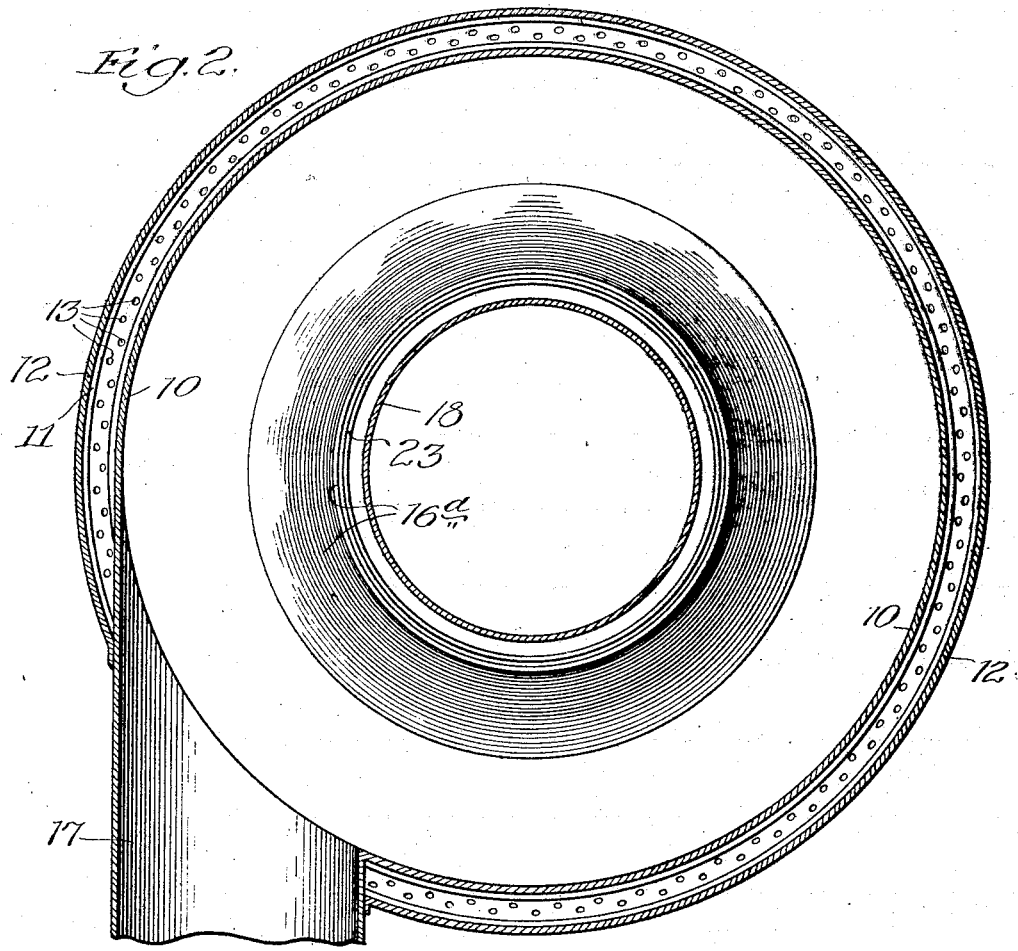
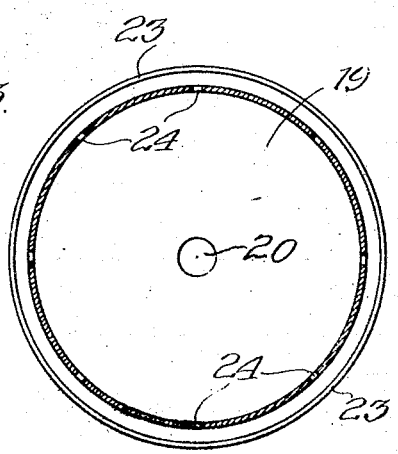

1,781,618

UNITED STATES PATENT OFFICE

GEORGE W. WATTS, OF WHITING, INDIANA, ASSIGNOR TO STANDARD OIL CO. OF INDIANA, OF WHITING, INDIANA, A CORPORATION OF INDIANA

TAR SEPARATOR

Application filed June 24, 1925. Serial No. 39,305.

This invention relates to tar separators and the like and is particularly adapted to be used in connection with apparatus for vacuum distillation of crude oils and the like.

An object of this invention is to separate unvaporized oil from vapors (and steam) and to collect such oil so that it may be pumped or otherwise conveyed to a suitable storage reservoir.

This and other objects as will hereinafter appear is accomplished by my invention which is fully described in the following specification and shown in the accompanying drawings, in which:

Figure 1 is a vertical section through the tar separator;

Fig. 2 is an enlarged horizontal section on the line 2—2 of Fig. 1; and

Fig. 3 is a similar section on the line 3—3 of Fig. 1.

The embodiment illustrated comprises a cylindrical tank 10 preferably of sheet metal which is reinforced with a number of circular members 11 of I-beam cross-section riveted or otherwise secured to the shell 10. A smooth internal shell 12 is likewise secured to the inside of the circular members 11 and is shown to extend at its lower end short of the outer shell 10. The space within the tank preferably communicates with the space between 10 and 12 by means of a number of perforations 13 in the webs of the I-beams forming the members 11 so that the pressure in the space between 10 and 12 and within the inner shell 10 shall be substantially uniform, throughout.

The shell is closed at the top by means of an arcuate head 14 and at the bottom by means of a hopper 15 which communicates with a large outlet pipe 16.

The inlet to the tar separator consists of a pipe 17 as shown in Fig. 2, which is connected tangentially to the shell near the upper portion thereof so as to give the mixture of steam and oil a spiral motion as it enters the shell 12 and passes down through the tar separator and out through the pipe 16. To further increase this spiral effect and to maintain the velocity of the entire mixture, I have provided a smooth circular central wall 18 which, together with the inner shell 12, forms an unobstructed annular space through which the mixture of steam and oil travels at high speed. Any suitable vacuum producing means (not shown) may be connected to the outlet. This central wall 18 extends from the top of the separator substantially therethrough, the lower portion of this central wall being tapered at 19 and terminating in a pipe 20 which makes connection, through a fitting such as a cross 21, with a pipe 22 which leads to a tar pump (not shown) or other means for removing the tar as it collects.

Some of the tar is deposited on the outer wall of the central member 18 and this flows down the same and is caught in a trough 23 and passes through openings 24 into the tapered bottom and thence to the pipe 22. Still more of the tar will be thrown outwardly against the inner shell 12 by the centrifugal action of the spirally moving mass of oil and steam. As this tar collects on the inner walls 12 it travels down along the wall and is caught by the hopper 15 and from here passes into the fitting 21 through pipes 25 and is discharged through a pipe 22. The steam, which is still preferably in a highly preheated condition, passes, together with the oil vapors, out through the annular opening between the tapered bottom 19 and the top of the outlet pipe 16, the latter preferably being inwardly inclined as shown at 16$^a$.

Manholes 26 and 27 are provided respectively at the top and bottom of the separator for easy access to the same for the purpose of cleaning and inspecting the same, and covers 28 and 29 are secured thereto in any desirable manner as by means of bolts or clamps (not shown).

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. A tar separator for separating a liquid from a gas comprising a vertically disposed cylindrical shell, a pipe discharging tangentially thereinto near the top of said shell, an outlet pipe near the bottom of said shell extending upwardly into the shell, a central tube forming with said shell an annular chamber, means associated with the annular space surrounding said outlet pipe for catching and draining liquid collecting on the inner wall of said shell, a ledge surrounding said tube, and a pipe connected thereto for draining liquid collecting on the outer surface of said tube into the first mentioned means.

2. A centrifugal tar separator for separating tar from a mixture of oil and steam under vacuum comprising an outer cylindrical shell, reinforcing means within said shell, an inner shell within said reinforcing means, means for introducing a mixture of oil and steam into said inner shell, said inner shell presenting substantially an unobstructed surface to said mixture, means for collecting liquid deposited on said inner shell and discharge means for the vapors and liquid.

3. A centrifugal tar separator for separating tar from a mixture of oil and steam under vacuum comprising an outer cylindrical shell, reinforcing means within said shell, an inner shell within said reinforcing means, means for introducing a mixture of oil and steam into said inner shell, said inner shell presenting substantially an unobstructed surface to said mixture, means for collecting liquid deposited on said inner shell, and discharge means for vapors and liquid the space between said shells communicating at the bottom with the interior of said separator.

4. A separating drum for operation under high vacuum and equipped with an inlet and outlet, comprising an external shell, reinforcing means extending interiorly around said shell, an inner shell secured to said reinforcing means and spaced from the external shell, and means for establishing communication between the space between said shells and the interior of the inner shell.

5. A centrifugal tar separator for separating tar from a mixture of oil and steam under vacuum comprising an outer cylindrical shell, means for reinforcing said shell, an outlet pipe near the bottom of said shell and extending into said shell so as to form an annular space between it and the shell, means within said outlet pipe for draining said annular space, a circular central wall located in the upper portion of said shell forming with said shell an annular chamber, means for introducing a mixture of steam and oil tangentially into the upper portion of said annular space so as to impart a spiral motion thereto, means for catching liquid collecting on the outer surface of said central wall, and means for carrying the liquid thus collected to the draining means for the annular space.

6. A tar separator for separating a liquid from a gas, comprising a vertically disposed cylindrical shell provided with a closed bottom, a central tube forming with said shell an annular chamber, a pipe discharging tangentially into said chamber near the top thereof, a gas outlet extending upwardly through the bottom of said shell and in substantially vertical alignment with said tube, and means associated with the annular space surrounding said outlet pipe for catching and draining liquid collecting on the inner walls of said shell.

GEORGE W. WATTS.